United States Patent [19]

Kountz et al.

[11] 4,282,718
[45] Aug. 11, 1981

[54] EVAPORATOR INLET WATER TEMPERATURE CONTROL SYSTEM

[75] Inventors: Kenneth J. Kountz, Hoffman Estates, Ill.; Richard A. Erth; Dean K. Norbeck, both of York, Pa.

[73] Assignee: Borg-Warner Corporation, Chicago, Ill.

[21] Appl. No.: 75,041

[22] Filed: Sep. 12, 1979

[51] Int. Cl.³ .................... F25B 5/00; F25D 5/00
[52] U.S. Cl. .................... 62/115; 62/201; 62/209; 62/228
[58] Field of Search ............ 62/185, 228 R, 228 B, 62/201, 115, 209

[56] References Cited

U.S. PATENT DOCUMENTS

| | | | |
|---|---|---|---|
| 3,751,940 | 8/1973 | Norbeck | 62/217 |
| 4,060,997 | 12/1977 | Shultz et al. | 62/185 X |
| 4,112,703 | 9/1978 | Kountz | 62/211 |
| 4,151,725 | 5/1979 | Kountz et al. | 417/19 X |

*Primary Examiner*—William E. Wayner
*Attorney, Agent, or Firm*—Thomas B. Hunter

[57] ABSTRACT

An evaporator inlet water temperature control system for controlling the inlet water temperature of an evaporator utilized in an inverter driven centrifugal chiller. The system creates the proper chilled water set point at the evaporator outlet needed to maintain the inlet water at its set point for greater efficiency of operation. Control is accomplished by generating an electrical error signal which is a function of an inlet water set point voltage and the actual inlet water temperature. A logic signal is produced as a function of the error signal detected by the circuit and establishes a dead zone band representing a range in which the error signal is acceptable. Output of the control system is passed to the capacity control circuit of an inverter driven centrifugal compressor chiller. When the inlet water temperature reaches its set point during pull-down, the logic output of the circuit sets a flip-flop which enables transmission gates to control changes in the outlet water set point as needed to balance the load of the cooling system.

16 Claims, 4 Drawing Figures

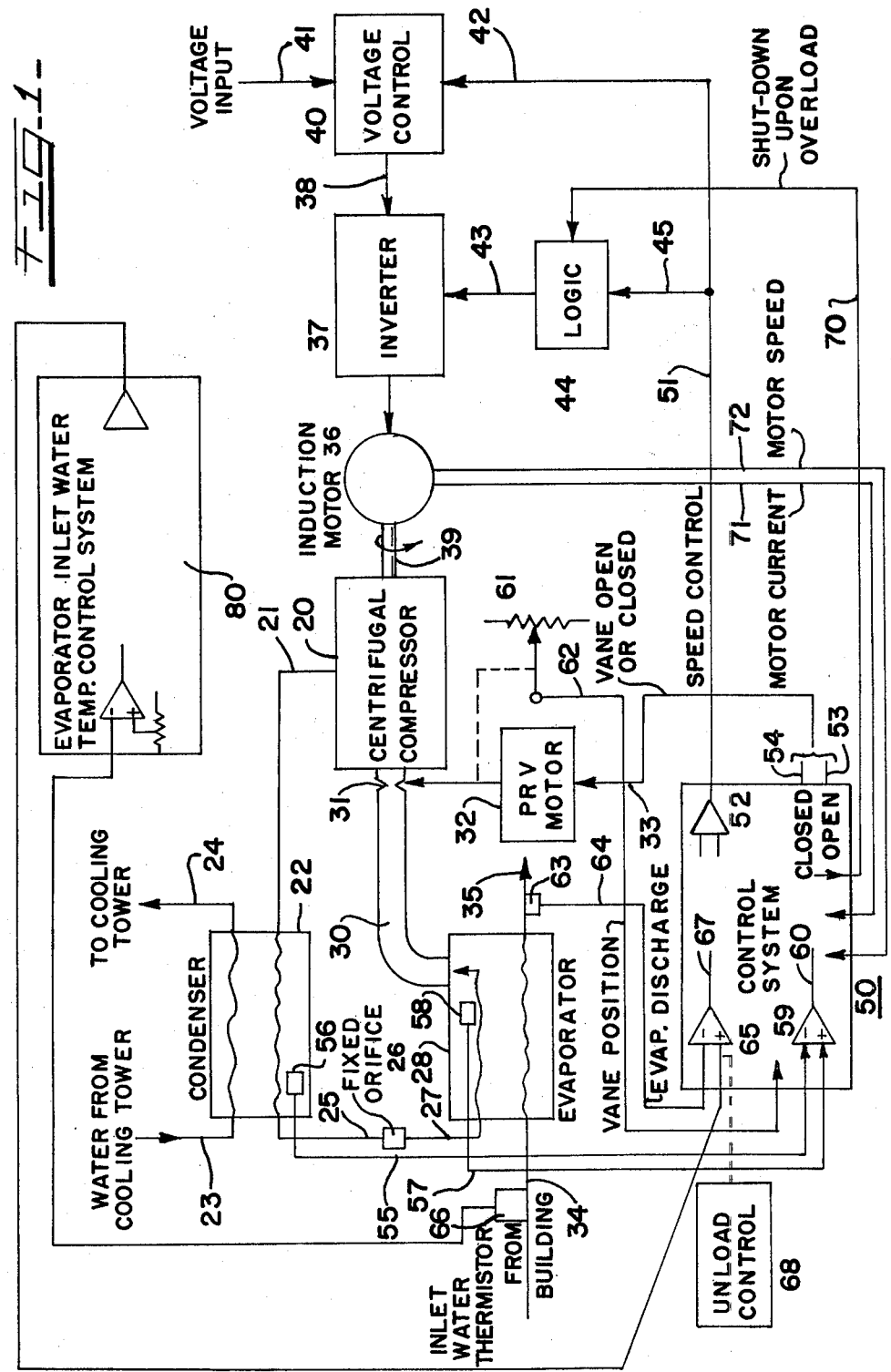

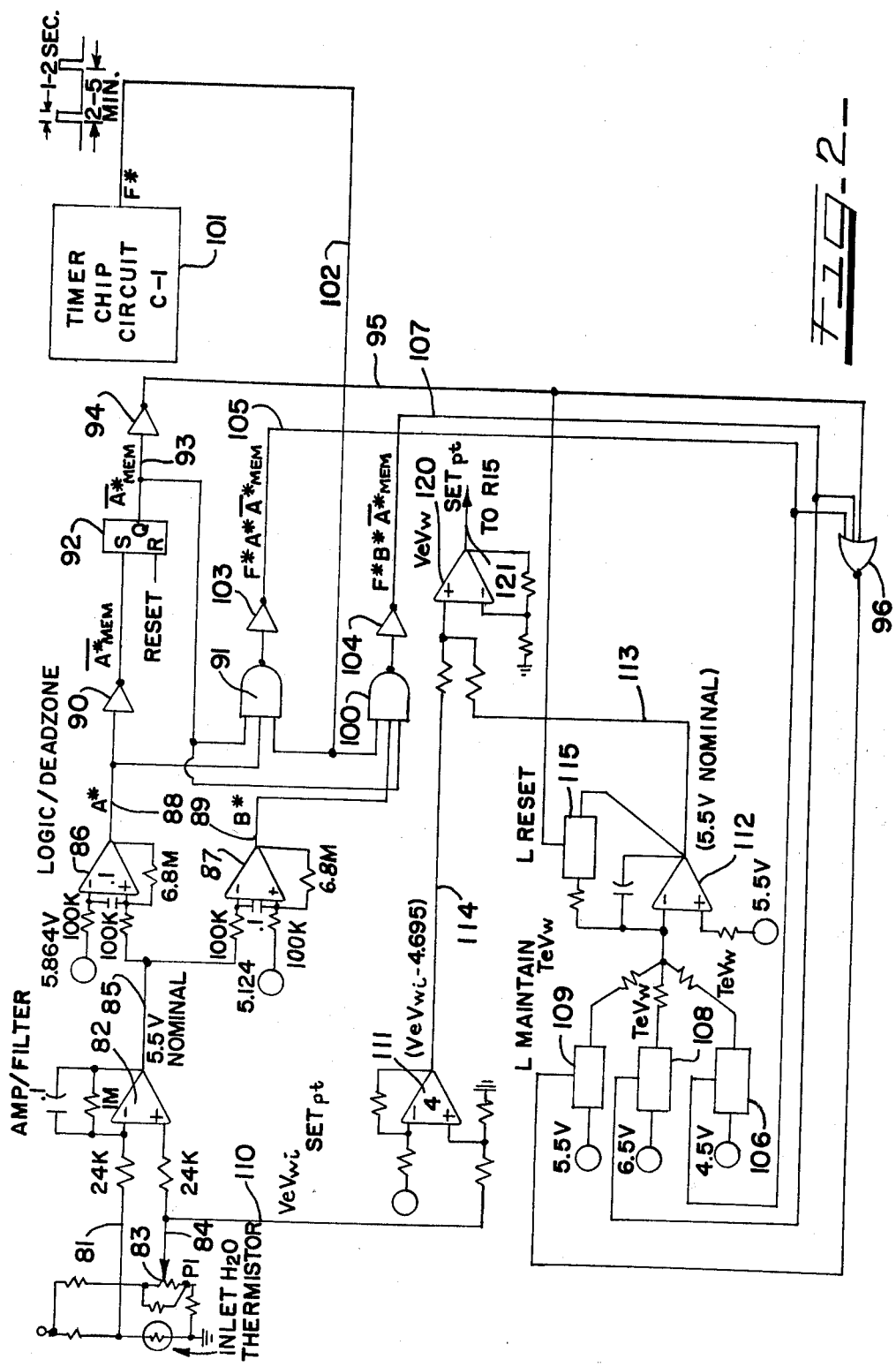

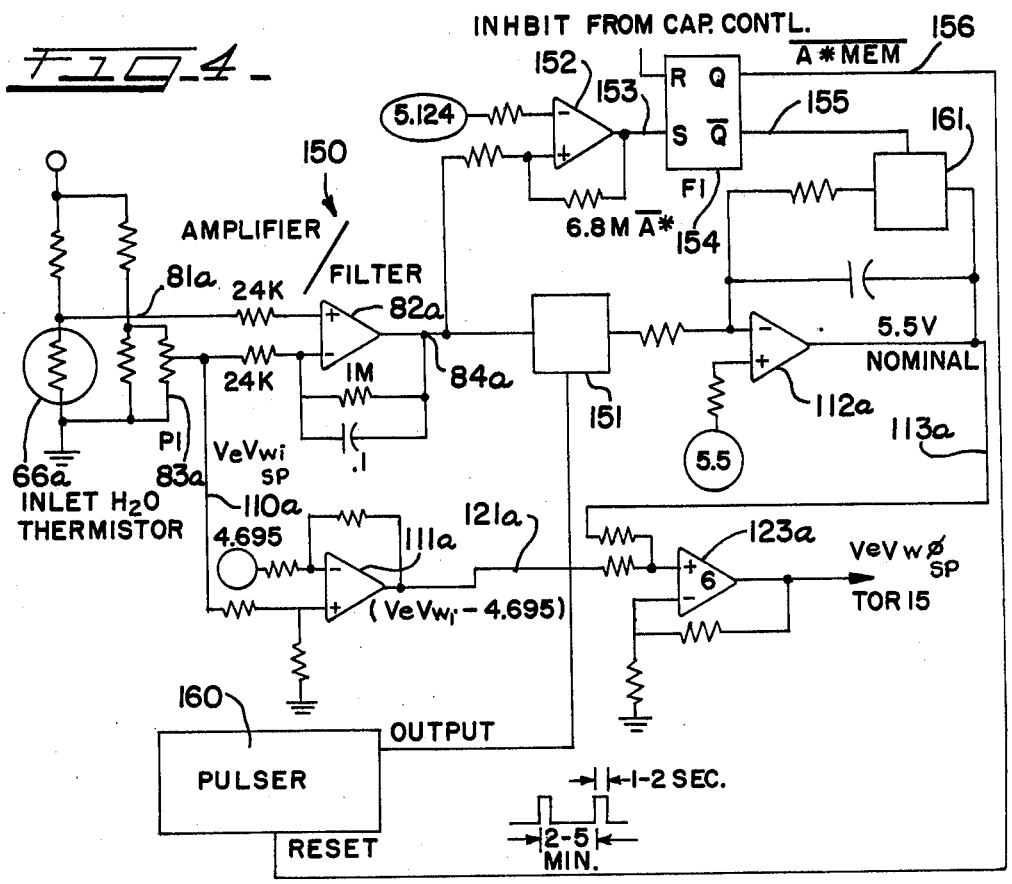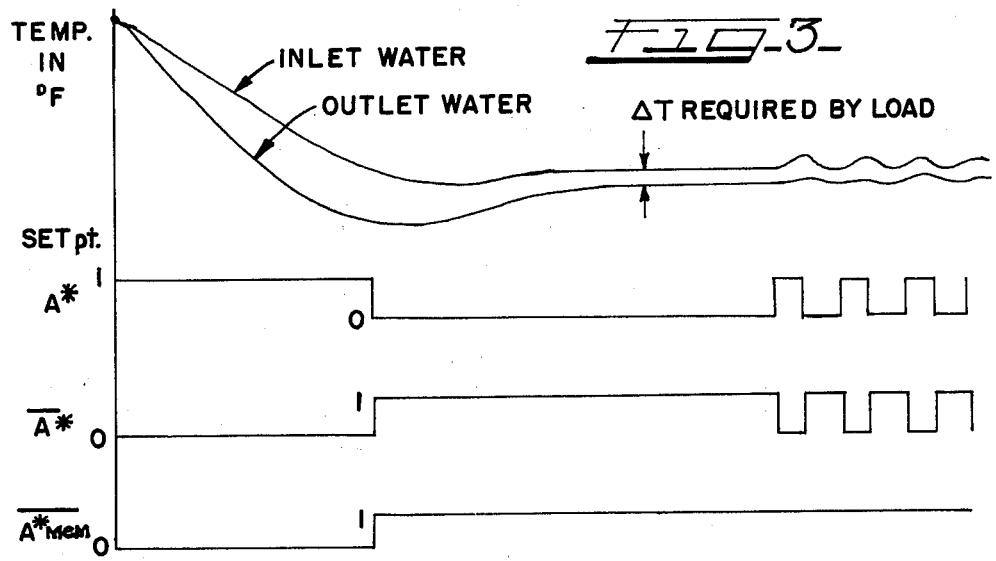

EVAPORATOR INLET WATER TEMPERATURE CONTROL SYSTEM

BACKGROUND OF THE INVENTION

A. Field of the Invention

This invention relates in general to cooling systems and, in particular, to a capacity control system for regulating chillers.

More specifically, without restriction to the particular use which is shown and described, this invention relates to an evaporator inlet water temperature control system for inverter-driven centrifugal compressor chillers by which evaporator inlet water temperature is controlled by creating the proper evaporator outlet chilled water temperature.

Large capacity air-conditioning systems commonly have employed centrifugal compressors having guide vanes which are adjustable to control the capacity of the compressor for effective and efficient operation. Control of compressor capacity through adjustment of the vanes alone, has proved to be unsatisfactory because of its resultant low efficiency operation of the system. In an effort to overcome such problems, attempts have been made to control not only the position of the pre-rotation vanes, but to regulate the speed of the electric motor driving the compressor for purpose of an energy effective system and to avoid surge.

One highly effective system which relies on vane adjustment and speed control to achieve superior capacity control of a centrifugal compressor chiller, is disclosed in U.S. Pat. No. 4,151,725 to Kountz et al for A Control System for Regulating Large Capacity Rotating Machinery and assigned to the assignee of this invention. In the system disclosed in U.S. Pat. No. 4,151,725, a control system effectively maximizes efficiency without encountering surge problems by monitoring the temperature of the refrigerant in the condenser discharge line, the temperature of the saturated refrigerant leaving the evaporator, the temperature of the chilled water discharged from the evaporator of the chiller, and the inlet guide vane position. Based on the foregoing four parameters and a set point temperature input, the control system described in U.S. Pat. No. 4,151,725 effectively regulates the refrigeration system by regulating the speed of the compressor and adjusting vane position.

The temperature of the chilled water sensed at the outlet from the evaporator in U.S. Pat. No. 4,151,725 is applied to a circuit which also receives a temperature set point signal from a potentiometer or another suitable unit, such as a thermostat in the building space. Thus, a signal is derived representing the difference, if any, between the set point temperature of the thermostat and the like and the instantaneous load. Greater efficiency could be attained in such a refrigeration system, however, if the inlet water being directed to the evaporator on return from the building is constantly monitored and the capacity control system is responsive thereto to maintain a constant or set point temperature at the inlet regardless of the load conditions. Maintenance of the set point inlet temperature of the water to the evaporator in response to actual load conditions would result in significantly improved efficiency and economy of operation since a variable input related directly to the temperature of the water after circulation is applied to the capacity control system.

B. Prior Art Patents

U.S. Pat. No. 4,112,703 to Kountz discloses a refrigeration control system in which a controlled space is maintained at a set point by adjusting the refrigerant temperature at the evaporator outlet in a refrigeration system. In U.S. Pat. No. 3,751,940 to Norbeck, a refrigeration system is disclosed having circuit means for automatically energizing the PRV motor.

SUMMARY OF THE INVENTION

It is, therefore, an object of this invention to maintain the inlet water temperature to a compressor of a chiller at a predetermined set point.

Another object of this invention is to maintain the inlet water to an evaporator of a chiller at a set point by regulating the water temperature at the evaporator outlet.

A further object of this invention is to achieve pull-down of a chiller to an inlet set point temperature of an evaporator by establishing a predetermined temperature difference between the inlet set point and the initial outlet set point of the evaporator.

Still another object of this invention is to generate an adaptive set point to maintain exit evaporator temperature as a differential function of inlet water set point temperature and actual water input temperature.

These and other objects are attained in accordance with the present invention wherein there is provided an evaporator inlet water temperature control system for an inverter driven centrifugal compressor. The set point temperature at the inlet to the evaporator is maintained by the system of the invention by creating the proper temperature of the chilled water at the evaporator outlet. The system herein disclosed includes means to develop a differential signal as a function of actual inlet temperature and inlet set point temperature which is compared to first and second reference voltages to establish a dead zone band in which an error signal is acceptable. During pull-down of the system until the evaporator inlet temperature reaches set point, the inlet and outlet temperature of the evaporator are maintained at a predetermined temperature difference. Upon the inlet temperature reaching the set point after pull-down, flip-flop circuit means are provided to cause outlet temperature to be regulated to maintain inlet temperature within a dead zone band of acceptable error during load conditions.

DESCRIPTION OF THE DRAWINGS

Further objects of the invention, together with additional features contributing thereto and advantages accruing therefrom, will be apparent from the following description of several embodiments of the invention which are shown in the accompanying drawings with like reference numerals indicating corresponding parts throughout, wherein:

FIG. 1 is a block diagram illustrating the incorporation of the evaporator inlet water temperature control system of the invention in a capacity control system to regulate the operation of a cooling system;

FIG. 2 is a schematic diagram which illustrates the circuit details of the evaporator inlet water temperature control system of FIG. 1;

FIG. 3 is a graphical illustration useful in understanding the operation of the invention shown in FIG. 2; and FIG. 4 is a schematic circuit diagram of another embodiment of the evaporator inlet water temperature control system of the invention.

DETAILED DESCRIPTION OF THE INVENTION

Although not intended to be so limited, the evaporator inlet water temperature control system of the invention is shown in FIG. 1 as being incorporated in the control system for regulating large capacity rotating machinery as disclosed in U.S. Pat. No. 4,151,725, to which reference is specifically made herein. In FIG. 1 there is illustrated the control system and cooling equipment in block diagram shown and described in U.S. Pat. No. 4,151,725 employing the evaporator inlet water temperature control system of the invention. In the following description, a general description is set forth of the components and related function of the cooling system shown in FIG. 1 to which the inlet temperature control system herein disclosed may, for example, supply a control signal to achieve an evaporator outlet temperature at a level to maintain a set point inlet temperature.

FIG. 1 depicts certain conventional components of a cooling system, such as a centrifugal compressor 20 for passing refrigerant (such as R-11 or another suitable medium) through line 21 to a condenser 22. In the condenser the water from the cooling tower passes from line 23 into the condenser, and is returned over line 24 to the cooling tower, or to the other head rejection means. The refrigerant at the discharge side of the condenser 22 is passed over line 25, through a fixed orifice 26, and line 27 to the refrigerant inlet connection of the evaporator. The refrigerant passes through the evaporator and out the duct 30, which includes a plurality of inlet guide vanes 31 positioned as shown. In this description the inlet guide vanes are termed PRV, or prerotation vanes, and the position of the PRV is regulated by a small motor 32 which receives a control signal over a plurality of conductors, here represented as a single line 33. Those skilled in the art will readily appreciate that a plurality of conductors are represented by the single lines of FIG. 1. The higher temperature water from the building (or other cooling load) is returned over line 34, cooled in the evaporator 28, and the chilled water is returned to the building over line 35.

An induction motor 36 is coupled over shaft 39 to the centrifugal compressor 20, and this motor 36 is itself driven from an inverter 37. The inverter receives a d-c input voltage over line 38, thus determining the amplitude of the inverter output voltage. A voltage control circuit 40 is provided between a voltage supply line 41 and line 38 which passes the voltage to the inverter. This can be a conventional circuit, such as a phase-controlled rectifier circuit, which receives an input a-c voltage on line 41 and provides a d-c voltage on line 38 which is regulated in accordance with the signal received over line 42. If no regulation is necessary, a d-c voltage can be supplied over line 38 to the inverter from batteries, a transformer-rectifier, or any suitable source. The frequency of the inverter output voltage is regulated by the periodicity of the timing signals, or gating signals, supplied over line 43 from a logic circuit 44. This is a well-known circuit which receives a regulating signal on line 45 and utilizes this regulating signal to govern the frequency of the pulses supplied on line 43. One well-recognized arrangement receives a d-c voltage as a control signal on line 45, and a voltage-controlled oscillator in the logic circuit 44 provides pulses at a frequency determined by the amplitude of the signal on line 45. The logic circuit generally includes a ring-counter type circuit to distribute the pulses to as many thyristors or other switches as are used in the inverter circuit.

The control system 50 is utilized to regulate not only the speed of induction motor 36, but also the physical position of the pre-rotation vanes 31, by a speed control signal supplied over line 51 and a vane position (drive open or drive closed) signal supplied over line 33. The circuit arrangement of the invention insures that surge is avoided, and that the compressor is regulated in the most energy-efficient manner. In this embodiment the speed control signal is a d-c voltage supplied from an integrating circuit 52, and the vane control signal can be either an "open vanes" signal on line 53 of a "close vanes" signal on line 54, or no signal ("hold vanes"). These output control signals are derived from different input signals, including a first signal on line 55 which is provided by a thermistor or other temperature sensing unit 56 positioned to contact the refrigerant in the condenser discharge line as shown. A second signal is provided on line 57, obtained from a second-sensing means or thermistor 58 which is exposed to the saturated refrigerant vapor leaving the evaporator. The first and second signals are combined in a summation means 59, which can be a differential amplifier circuit, to provide a resultant signal on line 60 which connotes the head of the compressor. A suitable means in the control system which utilizes this signal, and the other input signals, is described in detail in U.S. Pat. No. 4,151,725.

A potentiometer 61 is shown with its movable arm or wiper mechanically coupled to the PRV, or to the output shaft of motor 32 which drives the PRV. Thus, the electrical signal on line 62 indicates the physical position (fully open, ¾ open, and so forth) of the inlet guide vanes in a continuous manner. The inlet guide vane position signal can be appropriately combined with the compressor-head-indicating signal to assist in regulating the compressor operation.

A third temperature sensing means, which can be another thermistor 63, is positioned to sense the temperature of the chilled water discharged from the evaporator 28. Thermistor 63 thus provides a third signal, which is applied over line 64 to another differential amplifier stage 65, which also receives an evaporator inlet temperature set point signal from a fourth temperature sensing means such as, for example, in the form of a thermistor 66. Thermistor 66 is positioned in line 34 at the inlet of evaporator 28 to sense the temperature of the water on its return from its circuit through the building or other environment in which the system is operating.

The inlet temperature sensed by thermistor 66 is directed to the evaporator inlet water temperature control system of the invention which is generally designated by reference numeral 80 and will be described in detail later. Inlet temperature control circuit 80 monitors the evaporator inlet temperature in comparison to a selected inlet set point temperature and provides control system 80 with a signal to establish the proper outlet temperature of the evaporator to maintain the inlet water at its set point. Thus, the output signal on line 67 represents the difference, if any, between the condition called for (denoted by the signal derived from inlet control circuit 80) and the instantaneous load condition (represented by the signal on line 64).

In the foregoing description, a general perspective of a known refrigeration arrangement and the control system has been provided. For more specific details as to the circuitry and function of control system 50 utilized in controlling operation of the cooling system through adjustments of the inlet guide position of the PRV and speed of motor 36 of compressor 20, reference is made specifically to U.S. Pat. No. 4,151,725.

Referring now to FIG. 2, there is illustrated circuit details in schematic form of one embodiment of the evaporator inlet water temperature control system 80 of the invention to establish an outlet water temperature of the evaporator at a level sufficient to maintain the set point of the water inlet temperature of the evaporator. In FIG. 2, the inlet water temperature to the evaporator sensed by thermistor 66 is passed over line 81 and one of the 24 k resistors to an input terminal of a differential amplifier 82. The signal from the set point potentiometer 83, representing the set point inlet water temperature, is passed over line 84 and another 24 k resistor to the other input connection of stage 82 to sum the error between the set point inlet water temperature established by potentiometer 83 and the actual inlet temperature sensed by thermistor 66. A nominal d-c voltage of 5.50 volts is applied to the input of differential amplifier 82 and the output of amplifier 82 is 5.50 volts when there is no temperature error. When the output is other than 5.50 volts, this represents the temperature error signal on line 85 equal to the difference between set point and actual temperature. The signal on line 85 is passed to amplifier stages 86 and 87 to provide logic signals on lines 88 and 89 when the difference between the inlet set point temperature and inlet water temperature exceeds the amount of the dead band, or the dead zone area. In the illustrated embodiment, the dead zone was set to include a temperature difference of ±0.1° F., electrically represented by the difference between 5.12 volts and 5.86 volts applied to the stages 86 and 87. The expected voltage versus temperature relationship for the inlet thermistor 66 is:

$$V = 10.3 - .08049\ T_{evwi}\ T_{evwi} \overset{U}{\Longrightarrow} °F.$$

The signal from stage 86, representing a dead zone logic signal $A^*$, is passed over line 88 to an inverter 90, and as an input to a NAND gate 91. The inverted logic signal $\overline{A^*}$, after passing through inverter 90, is directed to a flip-flop 92 which is set in a manner to be described. The output signal from flip-flop 92 in the form of logic $\overline{A^*}_{mem}$ is passed over line 93 to an inverter 94 and subsequently by line 95 as one input to a NOR gate 96. The other dead zone logic signal $B^*$ formed by stage 87 is passed over a line 89 to one input of a NAND gate 100. The logic signal formed by flip-flop 92 on line 93 is coupled to second inputs to NAND gates 91 and 100. The third input of NAND gates 91 and 100 is provided by a timer chip circuit 101 which passes a logic signal $F^*$ to NAND gates 91 and 100 over line 102. Logic $F^*$ may be a data pulse of width of 1–2 seconds and having a period of 2–5 minutes, the function of which will be described later. The outputs from NAND gates 91 and 100 are respectively directed through inverters 103 and 104 and form respective logics. The signal created by NAND gate 91 and inverter 103 represents a logic Ld whereby $Ld = F^* A^* \overline{A^*}_{mem}$. NAND gate 100 and inverter 104 create logic Li whereby $Li = F^* B^* \overline{A^*}_{mem}$. Ld is a logic signal to decrease evaporator outlet temperature set point and Li is a logic signal to increase outlet water temperature set point. In addition, the logic, Lm, to maintain the outlet set point temperature is defined by $$\overline{Lm = Li + Ld + Lr}$$

where $Lr = \overline{A^*}_{mem}$.

Logic Ld is passed over line 105 as a second input to NOR gate 96 and as input to a transmission gate 106 having approximately 4.5 volts applied thereto. The logic Li is passed over line 107 as the third input to NOR gate 96 and further controls a second transmission gate 108 and release of approximately 6.5 volts. A third transmission gate 109 controlled by the logic signal Lm from NOR gate 96, controls release of a voltage of 5.5 volts. It should be apparent to one skilled in the art that release of gates 106, 108 and 109 is determined by logic signals, Li, Ld and Lm, respectively.

The output of potentiometer 83, representing the evaporator inlet set temperature, is passed over line 110 to the positive input of amplifier 111 having a voltage of 4.695 volts applied to its negative input. Another amplifier stage 112, having a 5.5 d-c voltage being applied to its positive input, directs a 5.5 volt nominal signal, during pull-down of the system, over line 113 to be combined with the output from amplifier 111 passed over line 114 whereby the initial value of the outlet water set point voltage is 0.805 volts higher (i.e., 10° F. lower) than the set point voltage of the inlet water. The amplifier stage 112 includes a transmission gate 115 connected thereacross and released by logic $\overline{A^*}_{mem}$ during pull-down to produce the 5.5 volts nominal output. After pull-down of the system, amplifier 112 then acts as an integrating circuit as will be apparent. The combined outputs from stages 111 and 112 are passed through amplifier stage 120 which produces a signal representing outlet water temperature set point to be passed by line 121 as an input to differential amplifier 65 of capacity control circuit 50 of FIG. 1. Amplifier 65 in control circuit 50 corresponds to amplifier 65 as shown in FIG. 6A in the above-identified Kountz et al. U.S. Pat. No. 4,151,725. In effect, the fixed 24 K resistor coupled to terminal 10 of amplifier 65 in Kountz et al. becomes, in the present invention, a variable resistance controlled by the evaporator inlet water temperature control circuit.

As shown in FIG. 3, the higher voltage of additional 0.805 volts as the initial outlet set point temperature establishes from initial start-up the pull-down function of outlet and inlet temperature which continues until such time as the set point of the inlet water is attained. During the pull-down phase, logic signal $A^*$ is logical high (1) whereby the logics applied to transmission gates 106, 108 and 109 are all logical low (0). During pull-down, it should further be apparent to one skilled in the art that the logic signal passed over line 95 from inverter 94 is high and releases transmission gate 115 connected across amplifier 112.

When the inlet water set point has been reached after pull-down as graphically represented in FIG. 3, logic signal $A^*$ goes low and thereby sets flip-flop 92 forming the logic signal $\overline{A^*}_{mem}$. When logic signal $\overline{A^*}_{mem}$ goes high the logic on line 95 is low to open gate 115 across amplifier 112. Thereafter, gates 106 and 108 are selectively released to alter outlet water set point to maintain the wave form shown in FIG. 3 after an initial increase in the outlet temperature after set point has been passed. After pull-down, the logic $A^*$ goes low and $\overline{A^*}$ goes high as shown in FIG. 3 while the $\Delta T$ required by the load is established. Thereafter, the formation of logic signals Lm, Ld and Li operate to control gates 106, 108, and 109 as required to balance the load and maintain evaporator inlet temperature. The logic F* from the timer chip circuit 101 during a pulse forms an input to NAND gates 91 and 100 and controls whether one of the signals Ld or Li are logical high. Between pulses of logic F*, three inputs of logic low are applied to NOR gate 96 to release gate 109. Thus, the alternate voltages of pulsed nature are applied to integrator 112. The output from integrator 112 is passed on line 113 and is combined with the signal from amplifier 114 to maintain inlet evaporator temperature.

Referring now to FIG. 4, there is illustrated still another embodiment of the evaporated inlet water temperature control system of the invention, generally designated by reference numeral 150. The control system 150 of FIG. 4 performs a similar function to regulate the inlet water temperature as was described with reference to the control system shown in FIGS. 2 and 3. The output of the control system 150 is coupled to the capacity control system 50 as described in connection with the preceding embodiment of the invention. The temperature of the inlet water to the evaporator 28 shown in FIG. 1 is sensed by thermistor 66a and compared to an inlet temperature set point represented by potentiometer 83a and a difference between the actual temperature and the set point temperature is formed by differential amplifier 82a as in the previous described embodiment. The output from differential amplifier 82a is passed over line 84a to a gate 151 and through a comparator circuit 152 which provides a logic signal A* on line 153 that is logical zero when the difference between inlet temperature is greater than the acceptable set selected zone determined by the 5.124 volts applied to stage 152. The logic signal on line 153 is directed to a flip-flop 154 similar in function to flip-flop 92 previously described in FIG. 2. Flip-flop 154 passes on lines 155 and 156 respectively, a logic signal $\overline{A^*}_{mem}$. The logic signal passed over line 156 is coupled to a pulser 160 which generates a pulse output similar to the pulse output of timing chip circuit 101 of the preceding embodiment. The other logic signal formed by flip-flop 154 on line 155 is passed to a transmission gate 161 connected across amplifier 112a. The function of amplifier 112a is identical to amplifier 112 described with reference to FIG. 2. The output from amplifier 112a is passed over line 113a to amplifier stage 123a of similar design as amplifier 123 in the previous embodiment.

Similarly as described with reference to the embodiment of FIG. 2, a signal is passed over line 110a through an amplifier 111a which acts to subtract a voltage of 4.695 from the 5.5 set point voltage of the inlet water temperature. During pull-down, the control circuit of FIG. 4 operates to permit the temperature of inlet water to reach set point as determined by the voltage supplied by amplifiers 112a and 111a to stage 123a, which is 0.805 volts higher than the set point inlet temperature. When the inlet temperature reaches the set point reference voltage, the signal on line 153 goes logical high whereby the flip-flop circuit causes the signal on line 156 to go logical high to generate pulses from pulser 160 while logic on line 155 goes low to close transmission gate 161. Thus, the pulser 160 generates an output signal to control release of transmission gate 151 and apply a pulsed signal to integrator 112a. The pulse height is dependent upon the error magnitude coming from differential amplifier 82a representing the difference between actual inlet temperature and set point inlet temperature. The rate of change in the integrator output directed to amplifier 123a over line 121a is dependent upon the magnitude of temperature error, to provide an input to control system as previously noted. The pulses from pulser 160 may be terminated directly by resetting pulser 160 and flip-flop 154.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include embodiments falling within the scope of the appended claims.

What is claimed is:

1. An evaporator inlet water temperature control system for a refrigeration system including a compressor having an adjustable capacity control means, a condenser and an evaporator having an inlet receiving fluid from a load and an outlet discharging chilled fluid to be returned to said load comprising:
    means for sensing the temperature of said fluid at the evaporator inlet,
    means for sensing the temperature of said fluid at the evaporator outlet,
    a first control circuit means coupled to said outlet fluid temperature sensing means to regulate said adjustable capacity control means in response to the temperature of said outlet fluid, said control circuit having a variable set point,
    means for establishing a set point temperature for the fluid at the evaporator inlet, and
    a second control circuit means coupled to said inlet fluid temperature sensing means and said set point temperature means to generate a differential electrical signal as a function of the difference between the sensed temperature and the set point temperature of the fluid,
    said second control circuit means having an output coupled to said first control circuit and dependent on said electrical signal for adjusting the variable setpoint and regulate the adjustable capacity control means to maintain the inlet set point temperature.

2. The system according to claim 1 wherein said output of said second control circuit regulates the adjustable capacity control means to maintain the level of inlet set point temperature within a dead-band range of acceptable error.

3. The system according to claim 1 wherein the output of the second control circuit means establishes a fluid temperature at the outlet of the evaporator sufficient to maintain said inlet set point temperature.

4. The system according to claim 3 wherein the output of said second control circuit means maintains a predetermined fluid temperature differential between the inlet and outlet of the evaporator during the pull-down phase.

5. The system according to claim 1 wherein said second control circuit means includes means to create electrical signals representative of said inlet temperature and said set point temperature.

6. The system according to claim 5 wherein said second control circuit means including means to combine said electrical signals to generate said differential electrical signal.

7. The system according to claim 1 wherein said second control circuit means includes a logic circuit responsive to said differential electrical signal to control said output.

8. The system according to claim 7 wherein said logic circuit includes a flip-flop device, said flip-flop device being activated after pull-down of the refrigeration system from initial activation when the inlet temperature has reached set point.

9. The system according to claim 7 wherein said second control circuit means include an output circuit controlled by said logic circuit, said output circuit producing said output to establish an initial evaporator outlet temperature at a predetermined value lower than the inlet set point temperature.

10. The system according to claim 8 wherein said logic circuit includes pulse producing means to create a periodic data pulse to periodically modify control of said output circuit.

11. The system according to claim 10 further including a pair of amplifier means having an input coupled to said differential signal, said amplifier means having different voltages applied to the respective inputs to form a dead zone logic signal representing acceptable error between actual and set point inlet temperature.

12. The system according to claim 9 wherein said output circuit includes transmission gate means controlled by said logic circuit.

13. The system according to claim 12 wherein said logic circuit periodically releases said transmission gate means to modify said output in response to said electric differential signal.

14. The system according to claim 1 further including pulse generating means coupled to gate means, said gate means having an input coupled to said differential electric signal, and said pulse generating means generating pulses to periodically release said gate means and produce a pulse output having height dependent on said differential electric signal.

15. The system according to claim 14 wherein said pulse output is applied to the input of integrating circuit means, the output of said integrating circuit controlling said output.

16. A method of maintaining the evaporator inlet temperature of a centrifugal compressor operated refrigeration system at a set point comprising the steps of
deriving a signal which represents the difference between actual inlet temperature and set point temperature,
creating a logic signal for the temperature error representing said difference,
establishing an initial outlet temperature of said evaporator during pull-down of the refrigeration system after activation from a rest state, and
applying said logic signal to temperature control means to modify said evaporator outlet temperature to maintain inlet set point temperature after the inlet set point temperature is attained after pull-down.

* * * * *